United States Patent
Raab et al.

(10) Patent No.: US 9,367,955 B2
(45) Date of Patent: Jun. 14, 2016

(54) SYSTEM, METHOD, AND COMPUTER PROGRAM PRODUCT FOR TILED SCREEN SPACE SAMPLE SCRAMBLING FOR PARALLEL DETERMINISTIC CONSISTENT LIGHT TRANSPORT SIMULATION

(71) Applicant: NVIDIA Corporation, Santa Clara, CA (US)

(72) Inventors: Matthias Raab, Berlin (DE); Carsten Alexander Wächter, Berlin (DE); Alexander Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 279 days.

(21) Appl. No.: 13/864,189

(22) Filed: Apr. 16, 2013

(65) Prior Publication Data

US 2014/0146050 A1    May 29, 2014

Related U.S. Application Data

(60) Provisional application No. 61/730,025, filed on Nov. 26, 2012.

(51) Int. Cl.
*G06T 15/50* (2011.01)

(52) U.S. Cl.
CPC .............. *G06T 15/506* (2013.01); *G06T 15/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,729,672 A * | 3/1998 | Ashton | ........................ | 345/589 |
| 6,529,193 B1 * | 3/2003 | Herken et al. | ................ | 345/426 |
| 2002/0080148 A1 * | 6/2002 | Uchino | ........................ | 345/629 |
| 2003/0063082 A1 * | 4/2003 | Abramov | ..................... | 345/418 |
| 2005/0041024 A1 * | 2/2005 | Green et al. | .................. | 345/426 |
| 2005/0264564 A1 * | 12/2005 | Keller | ........................... | 345/421 |
| 2007/0046686 A1 * | 3/2007 | Keller | ........................... | 345/581 |
| 2008/0100617 A1 * | 5/2008 | Keller et al. | .................. | 345/421 |
| 2009/0141026 A1 * | 6/2009 | Raab et al. | .................... | 345/424 |
| 2009/0153576 A1 * | 6/2009 | Keller | ........................... | 345/581 |
| 2009/0167763 A1 * | 7/2009 | Waechter et al. | ............. | 345/426 |
| 2010/0281480 A1 * | 11/2010 | Keller et al. | ................. | 718/100 |
| 2013/0194268 A1 | 8/2013 | Wachter et al. | | |

FOREIGN PATENT DOCUMENTS

WO    0203326    1/2002

OTHER PUBLICATIONS

Lemieux et al., "On Selection Criteria for Lattice Rules and Other Quasi-Monte Carlo Point Sets," (2001), 12 pages.*
Wächter, Carsten, and Alexander Keller. "Efficient simultaneous simulation of Markov chains." Monte Carlo and Quasi-Monte Carlo Methods 2006. Springer Berlin Heidelberg, 2008, 16 pages.*

(Continued)

*Primary Examiner* — Zhengxi Liu
*Assistant Examiner* — Roberta D Prendergast
(74) *Attorney, Agent, or Firm* — Zilka-Kotab, PC

(57) ABSTRACT

A system, method, and computer program product are provided for computing values for pixels in an image plane. In use, a low discrepancy sequence associated with an image plane is identified. Additionally, a function with the set of pixels of the image plane as a domain is determined. Further, a value is computed for each pixel in the image plane, utilizing the low discrepancy sequence and the function with the set of pixels of the image plane as a domain.

25 Claims, 6 Drawing Sheets

(56) References Cited

OTHER PUBLICATIONS

Chi, Hongmei. "Scrambled quasirandom sequences and their applications," Doctoral Dissertation, Florida State University Tallahassee, FL, USA ©2004 (2004).*
Piere L'Ecuyer et al., 2005, "Simulation in Java With SSJ," Proceedings of the 2005 Winter Simulation Conference, Editors Kuhl, M. E., N. M. Steiger, F. B. Armstrong, and J. A. Joines, 10 pages.*
L'Ecuyer, Pierre, Christian Lécot, and Bruno Tuffin. "Randomized quasi-Monte Carlo simulation of Markov chains with an ordered state space." Monte Carlo and Quasi-Monte Carlo Methods 2004. Springer Berlin Heidelberg, 2006. 331-342.*
L'Ecuyer, Pierre, and Francois Panneton. "Construction of equidistributed generators based on linear recurrences modulo 2." Monte Carlo and Quasi-Monte Carlo Methods 2000. Springer Berlin Heidelberg, 2002. 318-330.*
Niedereiter, et al., "Discrepancy Bounds for Hybrid Sequences Involving Digital Explicit Inverse Pseudorandom Numbers," Second International Conference on Uniform Distribution Theory Strobl am Wolfgangsee, Austria, Jul. 5-9, 2010, published in Uniform Distribution Theory 6 (2011), No. 1, 33-56.*
Wachter, C., U.S. Appl. No. 61/591,801, filed Jan. 27, 2012.
Keller, A., "Quasi-Monte Carlo Image Synthesis in a Nutshell," NVIDIA Research, 2012, pp. 1-37.
Niederreiter, H., "Random No. Generation and Quasi-Monte Carlo Methods," SIAM, 1992, pp. 1-243.
Keller, A. et al, "Myths of computer graphics," Monte Carlo and Quasi-Monte Carlo Methods, 2006, pp. 217-243.
Gruenschloss, L. et al., "Enumerating Quasi-Monte Carlo Point Sequences in Elementary Intervals," Monte Carlo and Quasi-Monte Carlo Methods, 2010, pp. 1-10.
Ernst, M. et al., "Filter Importance Sampling," IEEE EG Symposium on Interactive Ray Tracing, 2006, pp. 1-9.
Cranley, R. et al., "Randomization of Number Theoretic Methods for Multiple Integration," SIAM Journal on Numerical Analysis, vol. 13, No. 6, Dec. 1976, pp. 904-914.
Owen, A.B. "Randomly Permuted (t, m, s)-Nets and (t, s)-Sequences," Technical Report No. 464, Sep. 1994, pp. 1-20.
Wang, X. et al., "Randomized Halton Sequences," Mathematical and Computer Modelling, vol. 32, 2000, pp. 887-899.
Keller, A. et al., "Parallel Quasi-Monte Carlo Integration by Partitioning Low Discrepancy Sequences," NVIDIA Research, 2010, pp. 1-12.
Friedel, I. et al., "Fast Generation of Randomized Low Discrepancy Point Sets," Monte Carlo and Quasi-Monte Carlo Methods, 2004, pp. 1-17.
Kollig, T. et al., "Efficient Multidimensional Sampling," Eurographics, vol. 21, No. 3, 2002, pp. 557-563.
Sobol, I. M., "On the dristribution of points in a cube and the approximate evaluation of integrals," Zh. Vychisl. Mat. Mat. Fiz., vol. 7, No. 4, May 25, 1966, pp. 86-112.
Cook, R. L., "Stochastic Sampling in Computer Graphics," ACM Transactions on Graphics, vol. 5, No. 1, Jan. 1986, pp. 51-72.
Sobol, I. M. "Uniformly Distributed Sequences with an Additional Uniform Property," Zh. vychisl. Mat. mat. Fiz., vol. 16, No. 5, 1976, pp. 1332-1337.
Schlomer, T., et. al. "Semi-Stochastic Tilings for Example-Based Texture Synthesis," Eurographics Symposium on Rendering 2010, vol. 29, No. 4, 2010, pp. 1-9.
Examination Report from German Application No. 102013222678. 0, dated Sep. 24, 2014.
Office Action from Taiwan Application No. 102140530, dated Jun. 26, 2015.

* cited by examiner

«SYSTEM, METHOD, AND COMPUTER PROGRAM PRODUCT FOR TILED SCREEN SPACE SAMPLE SCRAMBLING FOR PARALLEL DETERMINISTIC CONSISTENT LIGHT TRANSPORT SIMULATION»

CLAIM OF PRIORITY

This application claims the benefit of U.S. Provisional Application No. 61/730,025, filed Nov. 26, 2012, the entire contents of which are incorporated herein by reference.

FIELD OF THE INVENTION

The present invention relates to rendering images, and more particularly to performing light transport simulation.

BACKGROUND

Traditionally, light transport simulation has been used to enhance visual realism of generated images. For example, light transport simulation may be used to generate realistic images by tracing paths of light through the pixels of an image plane. However, current techniques for performing light transport simulation have been associated with various limitations.

For example, current methods for performing light transport simulation may produce transient artifacts that may become visible during rendering. These artifacts may interfere with a user's perception of a generated image. There is thus a need for addressing these and/or other issues associated with the prior art.

SUMMARY

A system, method, and computer program product are provided for computing values for pixels in an image plane. In use, a low discrepancy sequence associated with an image plane is identified. Additionally, a function with the set of pixels of the image plane as a domain is determined. Further, a value is computed for each pixel in the image plane, utilizing the low discrepancy sequence and the function with the set of pixels of the image plane as a domain.

DETAILED DESCRIPTION

Figure 1:
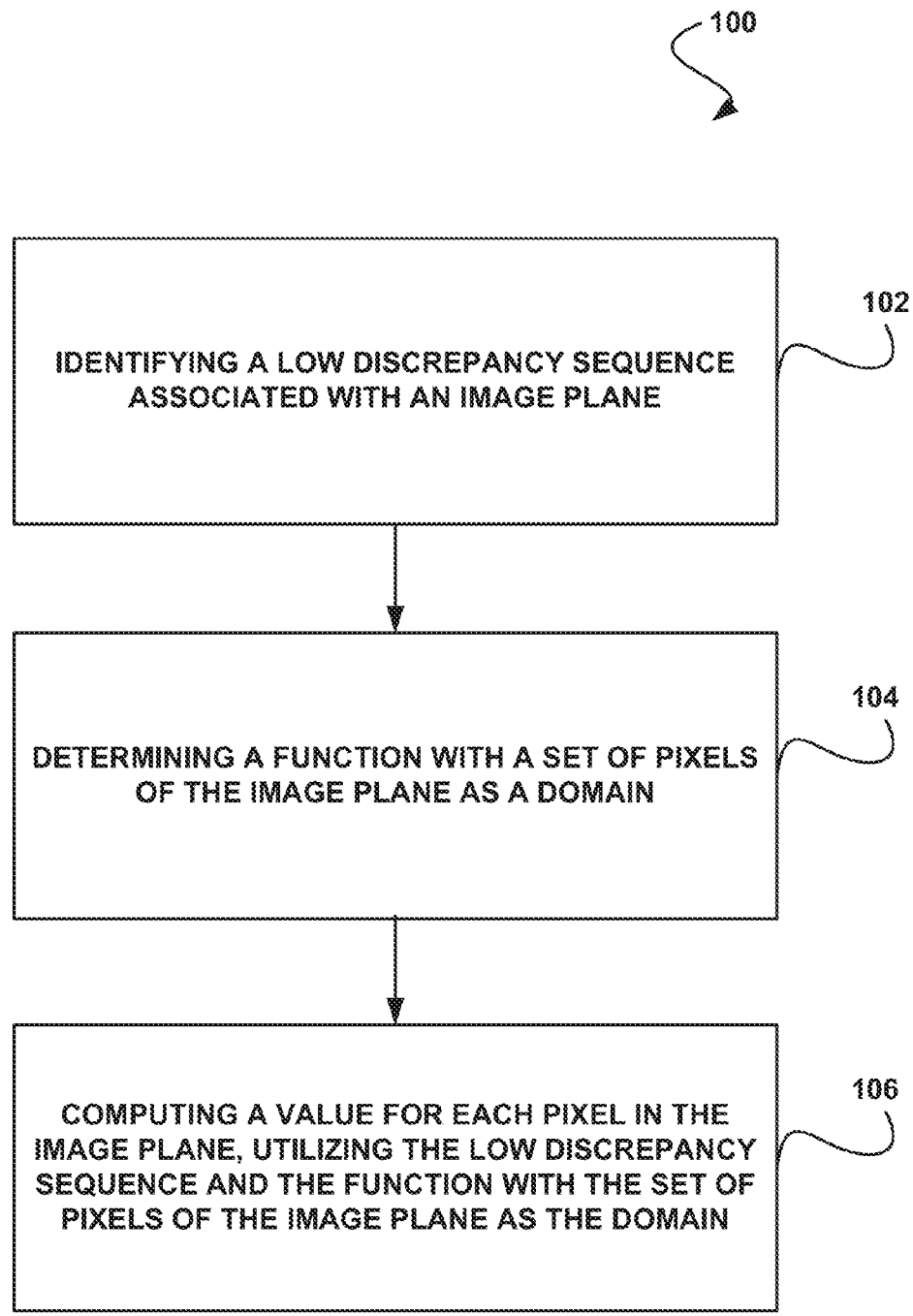
FIG. 1 shows a method for computing values for pixels in an image plane, in accordance with one embodiment.

FIG. 1 shows a method 100 for computing values for pixels in an image plane, in accordance with one embodiment. As shown in operation 102, a low discrepancy sequence associated with an image plane is identified. In one embodiment, the low discrepancy sequence may include a plurality of vectors. For example, the low discrepancy sequence may include a sequence of vectors featuring a low discrepancy. In another embodiment, the low discrepancy sequence may include a sequence $(x_i, y_i)$, where $x_i$ represents dimensions of a sink path segment, and $y_i$ represents dimensions of a source path segment. In yet another embodiment, the low discrepancy sequence may include a deterministic low discrepancy sequence.

Additionally, in one embodiment, the low discrepancy sequence may include a (t,s)-sequence in base b. In another embodiment, the low discrepancy sequence may include a rank-1 lattice sequence. In yet another embodiment, the low discrepancy sequence may include a Halton sequence. In still another embodiment, the low discrepancy sequence may include a hybrid sequence. See, for example, "Quasi-Monte Carlo Image Synthesis in a Nutshell" (A. Keller), which describes hybrid sequences and is hereby incorporated by reference in its entirety. Of course, however, the low discrepancy sequence may include any sequence of vectors with a low discrepancy.

Further, in one embodiment, the low discrepancy sequence may include a plurality of sampled vectors found within the image plane. For example, each vector within the low discrepancy sequence may represent a light transport path that is sampled within the image plane (e.g., a light transport path sampled from a high-dimensional path space within the image plane, etc.).

Further still, as shown in operation 104, a function with the set of pixels of the image plane as a domain is determined. In one embodiment, determining the function with the set of pixels of the image plane as a domain may include determining a function with the set of pixels of the image plane as a domain such that each pixel of the image plane shares a single mapping to another pixel in the image. In another embodiment, the function with the set of pixels of the image plane as a domain may be associated with one or more predetermined dimensions. For example, two dimensions may be determined in association with the image plane, and the function with the set of pixels of the image plane as a domain may be performed according to those two dimensions.

Also, in one embodiment, determining the function with the set of pixels of the image plane as a domain may include determining a permutation of the pixels of the image plane. For example, a permutation of the pixels of the image plane (e.g., an arrangement of the pixels within the image plane, etc.) may be determined, where the permutation may be selected to improve the perception of the image plane by the human visual system. For instance, the permutation of the pixels of the image plane may be determined according to how a human viewer processes image information, such that artifacts in the image plane may be resolved without a need for independent sampling.

In addition, in one embodiment, the function with the set of pixels of the image plane as a domain may be performed randomly. In another embodiment, the function with the set of pixels of the image plane as a domain may be performed utilizing one or more deterministic methods (e.g., to mimic the properties of a random mapping, etc.). In yet another embodiment, the function with the set of pixels of the image plane as a domain may include a fixed function with the set of pixels of the image plane as a domain. For example, the function with the set of pixels of the image plane as a domain may include a fixed permutation selected by an optimization process, where such optimization process may rate permutations by how much they resolve correlations on the average. In another example, the function with the set of pixels of the image plane as a domain may include a permutation generated by at least one permutation polynomial. In yet another example, the function with the set of pixels of the image plane as a domain may include a permutation determined by a pseudo-random mapping. In still another example, the function with the set of pixels of the image plane as a domain may include a permutation stored as a table.

Furthermore, as shown in operation 106, a value is computed for each pixel in the image plane, utilizing the low discrepancy sequence and the function with the set of pixels of the image plane as a domain. In one embodiment, the value computed for each pixel may include a contribution measurement (e.g., a measurement of light transport associated with that pixel, a color associated with the pixel, etc.). In another embodiment, for a first pixel in the image plane, the value for that pixel may be computed utilizing sampled vectors within the low discrepancy sequence that are associated with a second pixel mapped to the first pixel, utilizing the function with the set of pixels of the image plane as a domain.

Further still, in one embodiment, sampled vectors associated with a pixel may be transformed. For example, the sampled vectors may be transformed to mimic a filter kernel associated with the pixel to which the sampled vectors are associated. In another embodiment, a value may be computed for each pixel in the above manner as a pre-process to a noise removal procedure. For example, the above procedure may reduce a number of artifacts produced when rendering the image plane.

Also, in one embodiment, the image plane may be partitioned. For example, the image plane may be partitioned into a plurality of tiles, where each tile is processed as its own image plane. In another embodiment, a unique function with the set of pixels of the image plane as a domain may be associated with each tile. In yet another embodiment, each of the tiles may use a common shared function with the set of pixels of the image plane as a domain.

Additionally, in one embodiment, the sampled vectors within the low discrepancy sequence may be enumerated per pixel, such that an enumeration index may be associated with each pixel. In another embodiment, a portion of the enumeration index (e.g., an upper half of the bits of the enumeration index, the most significant bits of the index, etc.) may be selected randomly but fixed. In yet another embodiment, another portion of the enumeration index (e.g., a lower half of the bits of the enumeration index, the least significant bits of the index, etc.) may be selected randomly or pseudo-randomly. In another embodiment, permutation polynomials may be applied to the low discrepancy sequence to perform a deterministic scrambling. In this way, artifacts may be reduced.

Further, in one embodiment, the identified low discrepancy sequence may be partitioned into a plurality of low discrepancy sequences and the function with the set of pixels of the image plane as the domain may be used to select at least one of the partitions to compute a value for each pixel in the image plane utilizing the selected partition of the identified low discrepancy sequence. In another embodiment, the determined function with the set of pixels of the image plane as the domain may be utilized to select an individual first index for each pixel of the image plane, and the low discrepancy sequence may be enumerated, starting from the individual first index for each pixel of the image plane.

Further still, in one embodiment, the determined function with the set of pixels of the image plane as the domain may be utilized to modify an order of the enumeration of the identified low discrepancy sequence per pixel. In another embodiment, the function with the set of pixels of the image plane as the domain may be utilized to determine an initial value for one or more deterministic methods to generate streams of pseudo-random numbers that mimic the properties of streams of random numbers.

Also, in one embodiment, a value for each pixel in the image plane may be computed using the identified low discrepancy sequence modified by at least one of a Cranley-Patterson rotation, a scrambling, and a starting point utilizing the generated stream of pseudo-random numbers. In another embodiment, the same value of the determined function with the set of pixels of the image plane as the domain may be used across all the dimensions of the identified low discrepancy sequence. In yet another embodiment, the determined function with the set of pixels of the image plane as the domain may be utilized to modify the order of the enumeration of the identified low discrepancy sequence per pixel.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
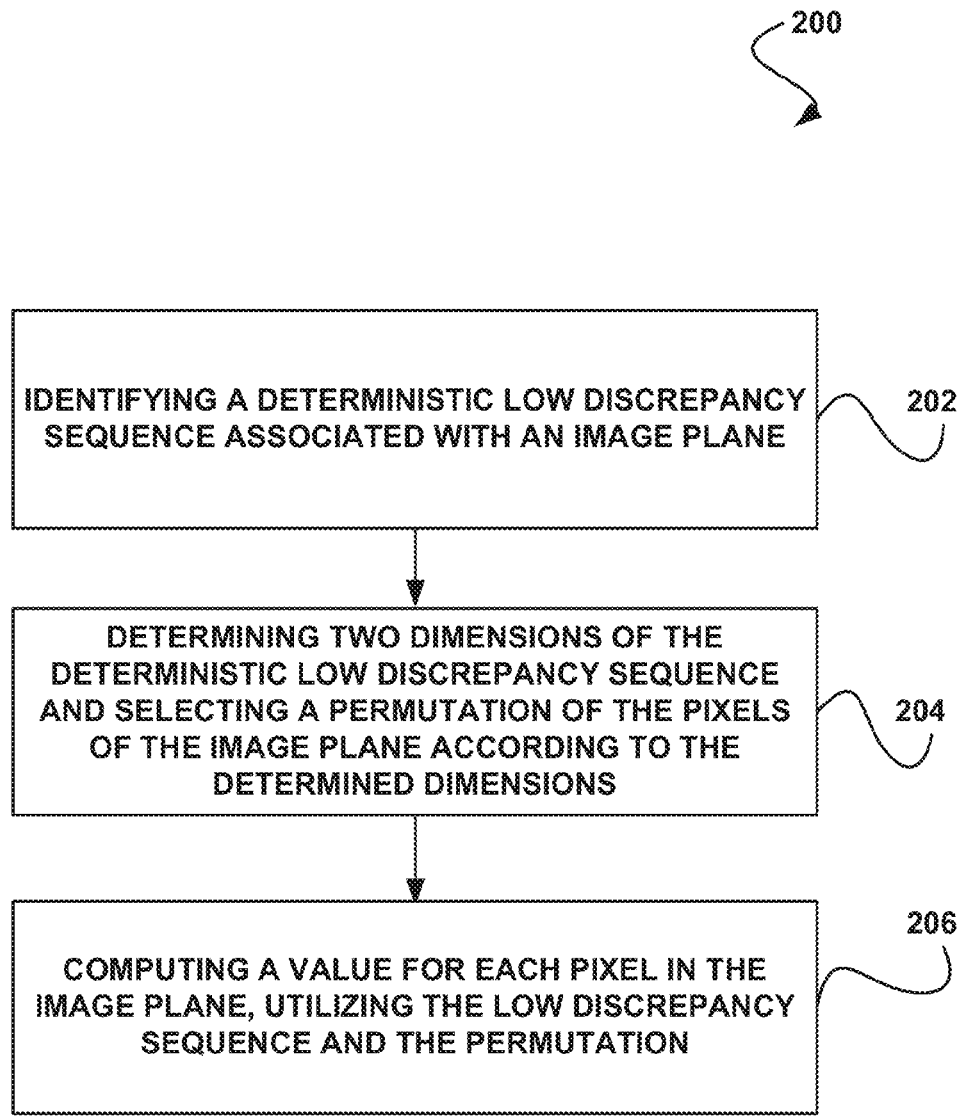
FIG. 2 shows a method for performing tiled screen space sample scrambling for parallel deterministic consistent light transport simulation, in accordance with another embodiment.

FIG. 2 shows a method 200 for performing tiled screen space sample scrambling for parallel deterministic consistent light transport simulation, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a deterministic low discrepancy sequence associated with an image plane is identified. In one embodiment, the deterministic low discrepancy sequence may include a sequence of vectors with a low discrepancy that is deterministic in nature. In another embodiment, the vectors included in the deterministic low discrepancy sequence may include sampled light transport paths from the image plane. In yet another embodiment, the image plane may include a plurality of pixels.

Additionally, in one embodiment, the deterministic low discrepancy sequence may include a Sobol' sequence, which may include a (t, s)-sequence in base b=2. See, for example, "On the Distribution of points in a cube and the approximate evaluation of integrals" (I. Sobol', Zh. vychisl, Mat. mat. Fiz., 7(4):784-802, 1967) and "Random Number Generation and Quasi-Monte Carlo Methods" (H. Niederreiter, SIAM, Philadelphia, 1992), which describe Sobol' sequences and is hereby incorporated by reference in its entirety. In another embodiment, the deterministic low discrepancy sequence may be generated for any dimension s. In yet another embodiment, fixing an m∈N and partitioning the Sobol' sequence into contiguous blocks of each $2^m$ points may result in each a Latin hypercube sample of $2^m$ points. In this way, each one dimensional orthogonal projection of any such block may have exactly one point in each set of a uniform partition of the unit interval into $2^m$ equidistant intervals.

Further, in one embodiment, the base b=2 may be sufficient to establish a bijection between pixels and partitions of the Sobol' sequence. In another embodiment, by covering the whole image plane using the first two dimensions of the Sobol' sequence, it may be possible to efficiently enumerate the points of the Sobol' sequence whose first two dimensions are in a selected pixel. In yet another embodiment, each of the sequences associated with a pixel by the bijection may be of low discrepancy, and consequently convergence may be guaranteed. See, for example, "Myths of computer graphics" (A. Keller, In H. Niederreiter, editor, Monte Carlo and Quasi-Monte Carlo Methods 2004, pages 217-243. Springer, 2006), which is hereby incorporated by reference in its entirety.

Additionally, as shown in operation 204, two dimensions of the deterministic low discrepancy sequence are determined, and a permutation of the pixels of the image plane is selected according to the determined dimensions. Further, as shown in operation 206, a value is computed for each pixel in the image plane, utilizing the low discrepancy sequence and the permutation. In one embodiment, the value computed for each pixel may include a color value.

In one embodiment, the parallel simulation of light transport for image synthesis may employ deterministic quasi-Monte Carlo methods. See, for example, "Enumerating Quasi-Monte Carlo Point Sequences in Elementary Intervals" (L. Grünschloβ, M. Raab, and A. Keller, In L. Plaskota and H. Woźniakowski, editors, Monte Carlo and Quasi-Monte Carlo Methods 2010, pages 399-408. Springer, 2012), which is hereby incorporated by reference in its entirety. In another embodiment, the color value of each pixel may be computed as an average contribution of a plurality of light transport paths (e.g., 1000 to 100,000 light transport paths, etc.) that are sampled from the high-dimensional path space.

Further still, in one embodiment, computing the value for each pixel in the image plane utilizing the low discrepancy sequence and the function with the set of pixels of the image plane as a domain may reduce a number of transient artifacts shown in a rendering of the image plane. For example, correlation artifacts may be perceptible among correlated pixels and may not be perceptible within a single pixel. In another embodiment, the permutation may include a bijection (e.g., an exact pairing of elements of two sets). For example, the amount of pixel correlation may be determined by a bijection that maps the partitions of the low discrepancy sequence (e.g., the Sobol' sequence or any other low discrepancy sequence) to pixels.

Also, in one embodiment, the bijection may be selected in accordance with how the human visual system processes image information, which may allow for a resolution of disturbing artifacts without the need for independent sampling. In another embodiment, the permutation of the pixels of the image plane may include a random permutation that is selected as a bijection to map partitions of the Sobol' sequence to pixels. In this way, all correlation between pixels and the projections of the Sobol' sequence onto the image plane may become independent and thus may not expose a regular structure. In another embodiment, the samples inside each pixel may have a low discrepancy and may therefore be correlated.

In addition, in one embodiment, the permutation of the pixels of the image plane may include a fixed permutation. For example, instead of randomly selecting a permutation before the deterministic sampling process, a fixed permutation may be used. Such a fixed permutation may be selected by an optimization process, which may rate permutations by how much they resolve correlations on the average. In another embodiment, the permutation of the pixels of the image plane may include permutation polynomials or other pseudo-random mappings selected by the aforementioned criterion. In still another embodiment, the permutation of the pixels of the image plane may include one or more tables of permutations.

Further, in one embodiment, using one low discrepancy sequence to cover the whole screen for light transport simulation may include quasi-Monte Carlo integro-approximation. For example, instead of computing independent pixel colors, the whole image may be computed as one function. This function may be displayed to the human visual system, which may process it by filtering and integration. In this way, the human visual system may be capable of separating image information from noise in a very efficient and convenient way.

Further still, in one embodiment, associating a partition of a Sobol' sequence with a pixel on the screen may be considered as a transformation of the underlying integrand, which may leave the set of samples unchanged. In another embodiment, this transformation may be chosen in a way that benefits from the human visual system's ability to separate noise from image information without affecting the speed of convergence of the underlying quasi-Monte Carlo sampling scheme.

Also, in one embodiment, the speed of convergence may not be affected, because each pixel may still use a low discrepancy sequence and thus its color may be computed in a consistent and deterministic way in parallel. In another embodiment, pixel filters may be enabled by transforming samples according to a selected filter kernel. See, for example, "Filter importance sampling" (M. Ernst, M. Stamminger, and G. Greiner, In Proc. 2006 IEEE/EG Symposium on Interactive Ray Tracing, pages 125-132, 2006), which is hereby incorporated by reference in its entirety.

Additionally, in one embodiment, in order to ameliorate artifacts during the initial set of samples, the Sobol' sequence may be enumerated per pixel, while the most significant bits of the index may be selected randomly but fixed. For example, in a 64 bit implementation, the 32 most significant bits may be selected at random per pixel, while the lower 32 bits may be used to enumerate Sobol' points inside that pixel. In another embodiment, in order to ameliorate artifacts that may appear in the long run, permutation polynomials may be applied to perform a deterministic scrambling. See, for example, Application No. 61/591,801, which is hereby incorporated by reference in its entirety. In another embodiment, the enumeration of the Sobol' sequence per pixel, while randomly selecting the most significant bits of the index, may be combined with the application of permutation polynomials to perform a deterministic scrambling.

In this way, artifacts may be removed from the rendered image plane without sacrificing convergence speed, thereby preserving advantages of a parallel deterministic approach.
Differentiation from Correlated Multi-Jittered Sampling Instead of considering permutations of pixels in order to assign samples of a deterministic low discrepancy sequence to pixels, another approach may create a set of multi-jittered samples per pixel. Table 1 illustrates an exemplary algorithm for the production of a canonical arrangement.

TABLE 1

Listing I: Producing the canonical arrangement.

```
for (int j = 0; j < n; ++j) {
    for (int i = 0; i < m; ++i) {
        p[j * m + i].x = (i + (j + drand48( )) / n) / m;
        p[j * m + i].y = (j + (i + drand48( )) / m) / n;
    }
}
```

The above algorithm produces a set of samples as a jittered Latin hypercube sample of n·m samples and has exactly one sample in each of the n·m cells. These cells then are rearranged by permuting all columns and then all rows, which in fact is a special case of scrambling. In order to guarantee for repeatability and uniqueness, permutations and jitter are computed by deterministic mappings that are parametrized by integers.

Deterministic scramblings can improve the quality of classic constructions of low discrepancy sequences, especially with respect to the minimum distance of the samples. While jittering samples of a Latin hypercube sample is a special case of scrambling, it can inhibit the efficiency of progressive sampling. Moreover, a minimum distance of the samples no longer can be guaranteed. In fact, jittering is only useful at low sampling rates. This is in accordance with the fact that in the limit aliasing is independent of the sampling scheme.

The production of the canonical arrangement may not be practical in higher dimensions, as the algorithm complexity is at least $O(2^s)$, where s is the dimension. In addition, applying the permutations and the jittering to such a high dimensional point set would allow for a clumping of on the order of $O(2^s)$ points across cell corners in addition to removing a minimum distance property, which may heavily affect the uniformity of the point set. In fact, the construction is not extensible and constructions for higher dimensions and hierarchical sampling are left as future work. Note that padding low dimensional patterns to sample in high dimensions does not necessarily result in the best efficiency as the best uniformity of the samples cannot be guaranteed in general. However, hierarchical sampling, progressive sampling, efficient construction for an arbitrary dimension s, a minimum distance property, and excellent uniformity are intrinsic properties that may be guaranteed by using low discrepancy sequences as presented in the previous sections.

Exploiting the Latin hypercube property to construct a point set for any number of samples is intrinsic to many low discrepancy sequences. For example, the Sobol' sequence in base b=2 or (0, s)-sequences in base b are Latin hypercube samples for $b^m$ samples, where m∈N. Rank-1 lattices exist for any number of samples and whenever the components of the generator vector are co-prime to the number of points, they are a Latin hypercube sample. Given the generator vector, rank-1 lattices with n points in s dimensions can be generated in $O(n \cdot s)$ time.

Using Pseudo-Random Mappings to Decorrelate Low Discrepancy Sequences

In one embodiment, additional methods may be used to decorrelate low discrepancy sequences. For example, using the same low discrepancy sequence for each pixel may expose transient correlation artifacts at low sampling rates. Applying an individual Cranley-Patterson-rotation for each pixel may resolve the transient artifacts. See, for example, "Randomization of number theoretic methods for multiple integration" (R. Cranley and T. Patterson, SIAM Journal on Numerical Analysis, 13:904-914, 1976), which is hereby incorporated by reference in its entirety. Similarly, an individual scrambling per pixel may resolve the transient artifacts. See, for example, "Randomly permuted (t; m; s)-nets and (t; s)-sequences" (In H. Niederreiter and P. Shiue, editors, Monte Carlo and Quasi-Monte Carlo Methods in Scientific Computing, volume 106 of Lecture Notes in Statistics, pages 299-315. Springer, 1995.), which is hereby incorporated by reference in its entirety.

As a third alternative, an individual starting point per pixel within the sequence may remove the transient artifacts. See, for example, "Randomized Halton sequences" (X. Wang and F. Hickernell, Math. Comput. Modelling, 32:887-899, 2000), which is hereby incorporated by reference in its entirety. A fourth alternative may be to select an individual first index per pixel, starting from which the low discrepancy sequence is enumerated. Yet another alternative to remove the transient artifacts is to use one dimension of a low discrepancy sequence to partition the one low discrepancy sequence into many low discrepancy sequences and to assign each one of the resulting low discrepancy sequences to each one pixel. See, for example, "Parallel Quasi-Monte Carlo Integration by Partitioning Low Discrepancy Sequences" (A. Keller and L. Grünschloβ), which is hereby incorporated by reference in its entirety.

In another embodiment, in order to achieve the desirable property of repeatability in parallel computing environments, deterministic algorithms that mimic the properties of random mappings may be used. Examples for such pseudo-random mappings may include pseudo-random number generators, which may be used instead of random numbers. See, for example, "Random Number Generation and Quasi-Monte Carlo Methods" (H. Niederreiter, SIAM, Philadelphia, 1992), which is hereby incorporated by reference in its entirety. Such a stream of pseudo-random numbers may be computed by applying a suitable deterministic pseudo-random number mapping to a state to compute the next state and iterating this procedure. Given a fixed initial state, the stream of pseudo-random numbers may be repeatable.

In one embodiment, a deterministic mapping of a pixel identifier may not be disclosed to an associated sampling pattern. In another embodiment, an association of a stream of pseudo-random numbers and a specified pixel may result from interpreting the pixel identifier (e.g., its offset in the frame buffer, etc.) as an initial state of the pseudo-random number generator. This may include a special case of XOR-scrambling, which may be realized on a computer using a bit vector XOR operation. See, for example, "Fast generation of randomized low discrepancy point sets" (I. Friedel and A. Keller, In H. Niederreiter, K. Fang, and F. Hickernell, editors, Monte Carlo and Quasi-Monte Carlo Methods 2000, pages 257-273, Springer, 2002) and "Efficient multidimensional sampling" (T. Kollig and A. Keller, Computer Graphics Forum (Proc. Eurographics 2002), 21(3):557-563, September 2002), which are hereby incorporated by reference in their entirety.

Also, in one embodiment, instead of a stream of pseudo-random numbers per pixel, the first number resulting from the pseudo-random mapping may be applied to the pixel identifier for all dimensions. For example, in the case of a Cranley-Patterson-rotation, this first number may be used for all dimensions. In case of the scrambling, this first number may be used for XOR-scrambling in all dimensions. In another embodiment, the first number from a pseudo-random mapping may also be used as the initial index, and the low discrepancy sequence may be enumerated starting from this number.

Table 2 illustrates two exemplary initial indices, in accordance with one embodiment. Of course, it should be noted that the exemplary indices shown in Table 2 are set forth for illustrative purposes only, and thus should not be construed as limiting in any manner.

TABLE 2 initial_index = (Offset * Offset * 16807) & 0x007fffff;
initial_index = (PositionX * 277 + PositionY * 610) % 987;

As shown in Table 2, "Offset" may include the offset of the pixel within the frame buffer memory array, and PositionX and PositionY may include the pixel coordinates in the two dimensional pixel array. In one embodiment, an algorithm may XOR the first number from a pseudo-random mapping with the index used for enumerating the samples inside a pixel, which may result in changing the order of sample enumeration per pixel.

Figure 3:
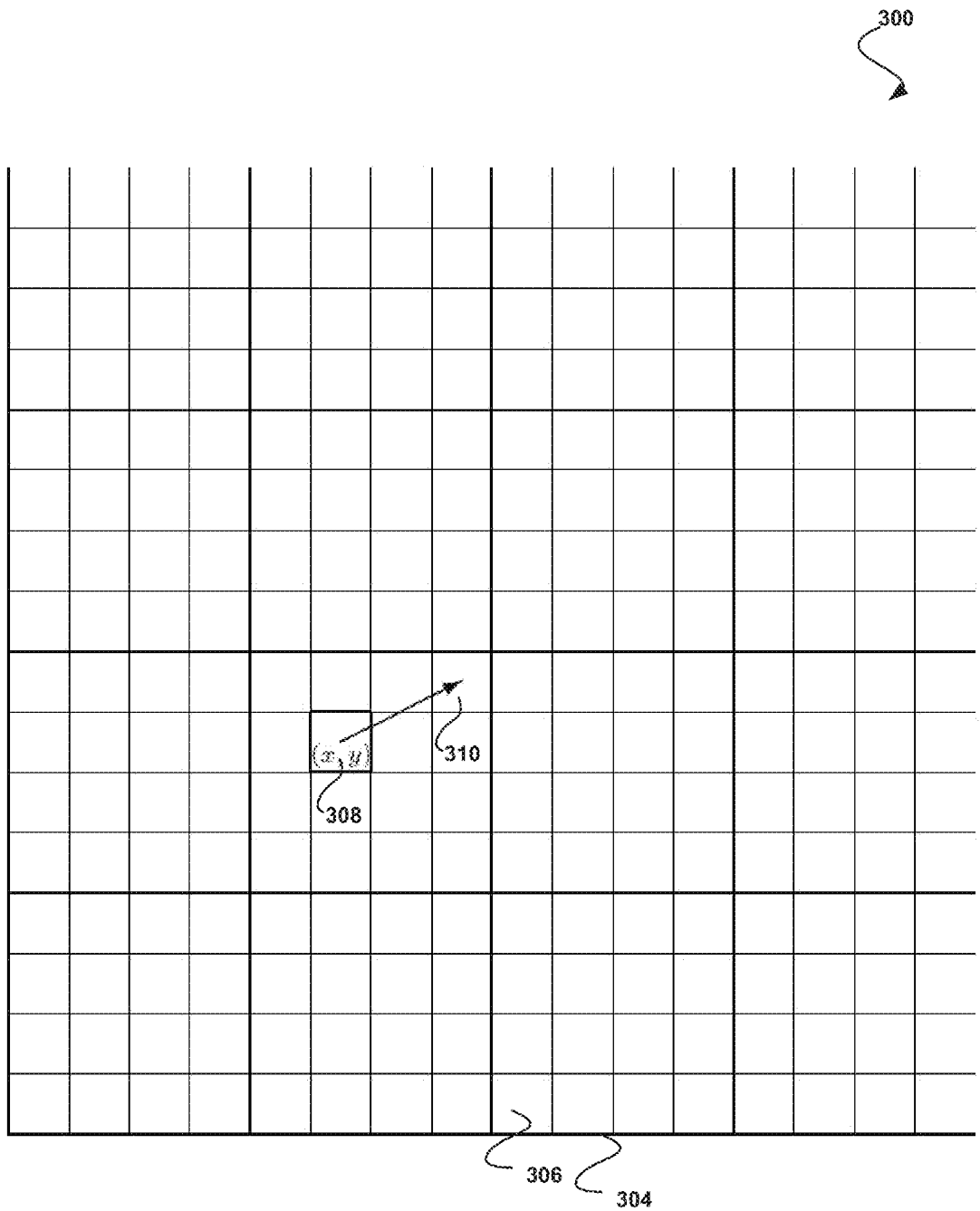
FIG. 3 shows an exemplary tiled sample scrambling approach, in accordance with another embodiment.

FIG. 3 shows an exemplary tiled sample scrambling approach within a screen 300, in accordance with another embodiment. As an option, the approach 300 may be carried out in the context of the functionality of FIGS. 1-2. Of course, however, the approach 300 may be implemented in any desired environment. It should also be noted that the aforementioned definitions may apply during the present description.

As shown, a screen 300 is partitioned into 4×4 tiles 304 that each contain 4×4 pixels 306. The samples for a pixel 308 at a given screen coordinate (x,y) are taken from another pixel 310 inside the tile. In one embodiment, each tile 304 of pixels 306 may be assigned its own permutation to uniquely reference the samples of another pixel.

Figure 4:
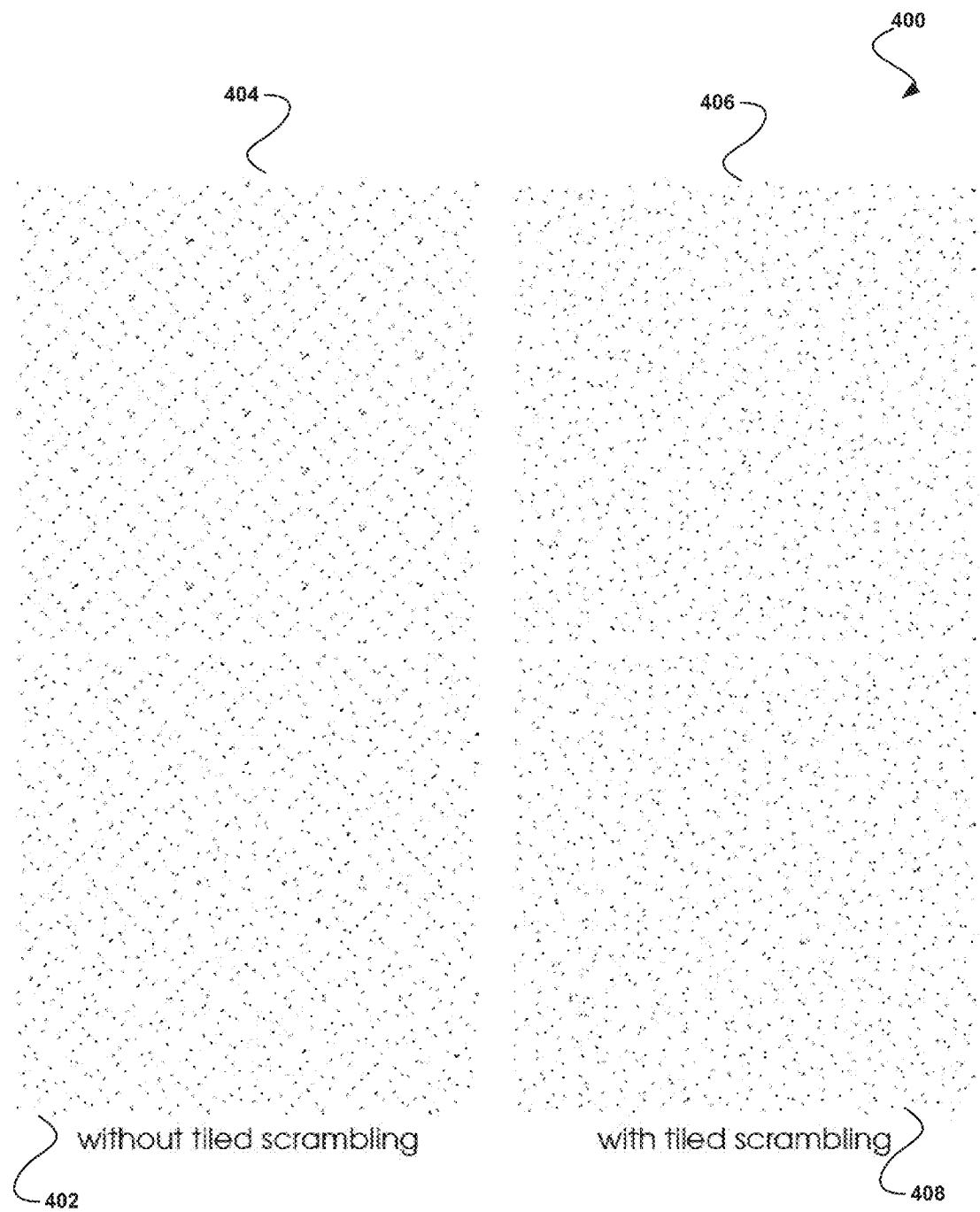
FIG. 4 shows an effect of a tiled pixel sample scrambling procedure on samples of a Sobol' sequence, in accordance with another embodiment.

In another embodiment, instead of using the partition of the Sobol' sequence associated to a pixel (x,y) 308 on the screen, the samples of another pixel 310 are used. In yet another embodiment, instead of using one permutation over the whole screen, in one embodiment the screen is partitioned into blocks 304, where each block 304 may be using its own permutation among its associated pixels. The effect of a tiled pixel sample scrambling procedure on the samples of the Sobol' sequence is shown in FIG. 4, which shows 1000 samples of a Sobol' sequence in structures 402-406 visible in a two dimensional projection. Structures 402 and 406 include the original points shown without tiled sample scrambling, and structures 406 and 408 illustrate the samples resulting from tiled sample scrambling.

Figure 5:
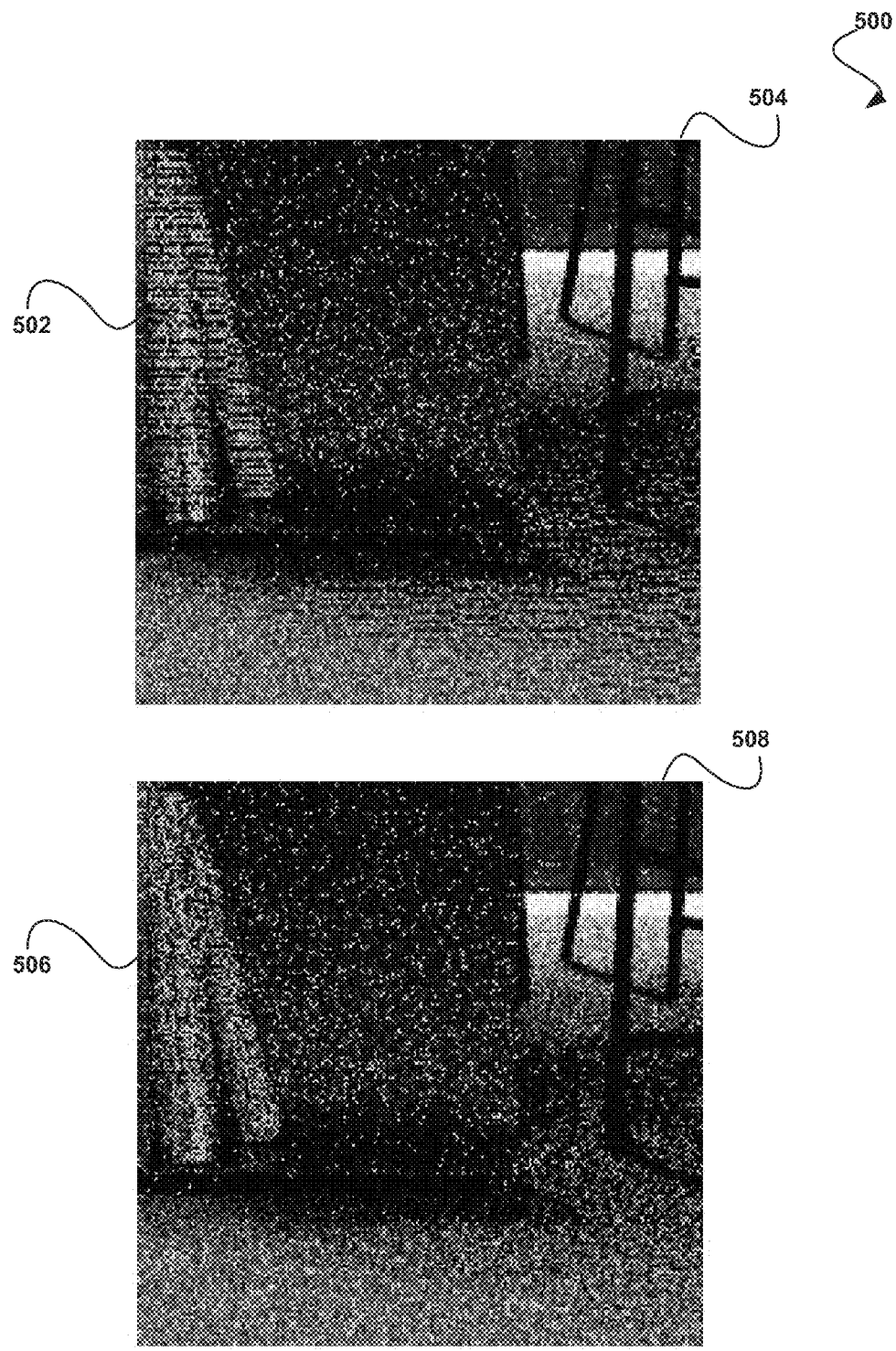
FIG. 5 shows structured transient artifacts in a light transport simulation as well as the removal of such transient artifacts in an updated light transport simulation, in accordance with another embodiment.

Further, FIG. 5 shows structured transient artifacts 502 in a light transport simulation 504 as well as the removal 506 of such transient artifacts in an updated light transport simulation 508, illustrating the results of tiled sample scrambling.

Figure 6:
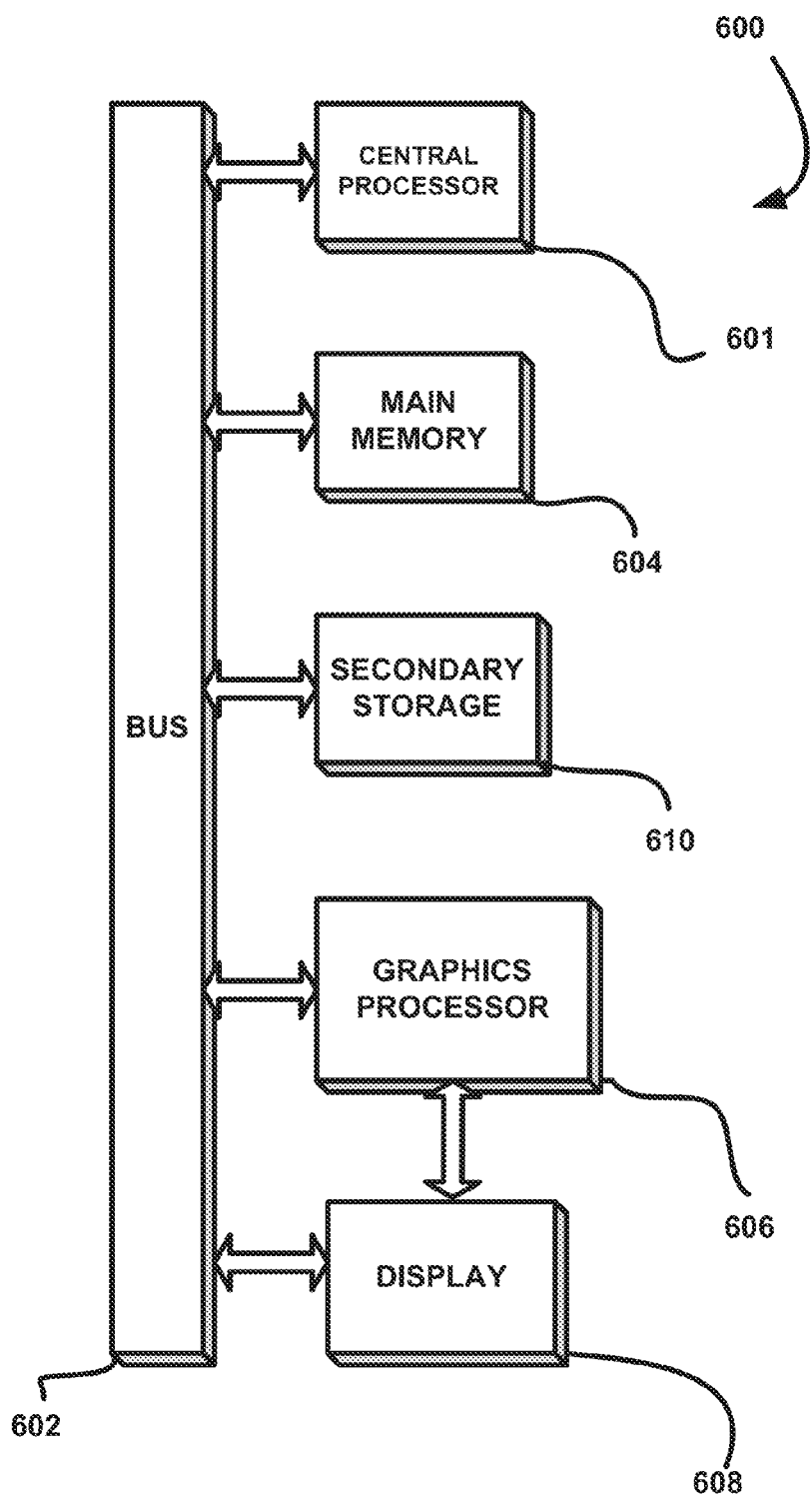
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610, volatile or non-volatile storage, and/or any other type of storage are possible examples of non-transitory computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, and/or any other type of logic. Still yet, the system 600 may take the form of various other devices m including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a low discrepancy sequence associated with an image plane;
determining a function with a set of pixels of the image plane as a domain; and
computing a value for each pixel in the image plane, utilizing the low discrepancy sequence and the function with the set of pixels of the image plane as the domain, wherein the function with the set of pixels of the image plane as the domain includes a fixed permutation selected by an optimization process, where such optimization process rates permutations by how much they resolve correlations on the average.

2. The method of claim 1, wherein determining the function with the set of pixels of the image plane as the domain includes determining a function with the set of pixels of the image plane as the domain such that each pixel of the image plane shares a single mapping to another pixel in the image plane.

3. The method of claim 1, wherein the function with the set of pixels of the image plane as the domain is associated with one or more predetermined dimensions.

4. The method of claim 1, wherein two dimensions are determined in association with the image plane, and the function with the set of pixels of the image plane as the domain is performed according to those two dimensions.

5. The method of claim 1, wherein determining the function with the set of pixels of the image plane as the domain includes determining a permutation of the pixels of the image plane.

6. The method of claim 1, wherein determining the function with the set of pixels of the image plane as the domain includes determining a permutation of the pixels of the image plane, where the permutation is selected to improve the perception of the image plane by the human visual system.

7. The method of claim 1, wherein the function with the set of pixels of the image plane as the domain is performed randomly.

8. The method of claim 1, wherein the function with the set of pixels of the image plane as the domain is performed utilizing one or more deterministic methods to mimic the properties of a random function with the set of pixels of the image plane as the domain.

9. The method of claim 1, wherein the function with the set of pixels of the image plane as the domain includes a fixed function with the set of pixels of the image plane as the domain.

10. The method of claim 1, wherein the function with the set of pixels of the image plane as the domain includes a permutation generated by at least one permutation polynomial.

11. The method of claim 1, wherein the function with the set of pixels of the image plane as the domain includes a permutation determined by a pseudo-random mapping.

12. The method of claim 1, wherein the function with the set of pixels of the image plane as the domain includes a permutation stored as a table.

13. The method of claim 1, wherein sampled vectors associated with a pixel are transformed to mimic a filter kernel associated with the pixel to which the sampled vectors are associated.

14. The method of claim 1, wherein the image plane is partitioned into a plurality of tiles, where each tile is processed as its own image plane.

15. The method of claim 14, wherein a unique function with the set of pixels of the image plane as the domain is associated with each tile.

16. The method of claim 14, wherein each of the tiles use a common shared function with the set of pixels of the image plane as the domain.

17. The method of claim 1, wherein sampled vectors within the low discrepancy sequence are enumerated per pixel, such that an enumeration index is associated with each pixel, where a portion of the enumeration index is selected randomly but fixed, and where another portion of the enumeration index is selected randomly or pseudo-randomly.

18. The method of claim 1, wherein the identified low discrepancy sequence is partitioned into a plurality of low discrepancy sequences and the function with the set of pixels of the image plane as the domain is used to select at least one of the partitions to compute a value for each pixel in the image plane utilizing the selected partition of the identified low discrepancy sequence.

19. The method of claim 1, wherein the determined function with the set of pixels of the image plane as the domain is utilized to select an individual first index for each pixel of the image plane, and the low discrepancy sequence is enumerated, starting from the individual first index for each pixel of the image plane.

20. The method of claim 1, wherein the determined function with the set of pixels of the image plane as the domain is utilized to modify the order of the enumeration of the identified low discrepancy sequence per pixel.

21. The method of claim 1, wherein the function with the set of pixels of the image plane as the domain is utilized to determine an initial value for one or more deterministic methods to generate streams of pseudo-random numbers that mimic the properties of streams of random numbers.

22. The method of claim 21, wherein a value for each pixel in the image plane is computed using the identified low discrepancy sequence modified by at least one of a Cranley-Patterson rotation, a scrambling, and a starting point utilizing the generated stream of pseudo-random numbers.

23. The method of claim 22, wherein the same value of the determined function with the set of pixels of the image plane as the domain is used across all the dimensions of the identified low discrepancy sequence.

24. A non-transitory computer-readable storage medium storing instructions that, when executed by a processor, cause the processor to perform steps comprising:
    identifying a low discrepancy sequence associated with an image plane;
    determining a function with the set of pixels of the image plane as a domain; and
    computing a value for each pixel in the image plane, utilizing the low discrepancy sequence and the function with the set of pixels of the image plane as the domain, wherein the function with the set of pixels of the image plane as the domain includes a fixed permutation selected by an optimization process, where such optimization process rates permutations by how much they resolve correlations on the average.

25. A system, comprising:
    a processor for identifying a low discrepancy sequence associated with an image plane, determining a function with the set of pixels of the image plane as a domain, and computing a value for each pixel in the image plane, utilizing the low discrepancy sequence and the function with the set of pixels of the image plane as the domain, wherein the function with the set of pixels of the image plane as the domain includes a fixed permutation selected by an optimization process, where such optimization process rates permutations by how much they resolve correlations on the average.

* * * * *